(12) United States Patent
Matsuo et al.

(10) Patent No.: US 8,380,162 B2
(45) Date of Patent: Feb. 19, 2013

(54) EXTENDED EMERGENCY NOTIFICATION SYSTEMS AND METHODS

(75) Inventors: Kotaro Matsuo, San Diego, CA (US); Dean Williams, San Diego, CA (US)

(73) Assignee: Greatcall, Inc., San Diego, CA (US)

( * ) Notice: Subject to any disclaimer, the term of this patent is extended or adjusted under 35 U.S.C. 154(b) by 0 days.

(21) Appl. No.: 13/276,233

(22) Filed: Oct. 18, 2011

(65) Prior Publication Data

US 2012/0171989 A1  Jul. 5, 2012

Related U.S. Application Data

(63) Continuation of application No. 12/981,822, filed on Dec. 30, 2010.

(51) Int. Cl.
  *H04M 11/04* (2006.01)
(52) U.S. Cl. ........... 455/404.2; 455/404.1; 455/414.1
(58) Field of Classification Search ........... 455/404.1, 455/404.2
  See application file for complete search history.

(56) References Cited

U.S. PATENT DOCUMENTS

| | | | |
|---|---|---|---|
| 3,663,762 A | 5/1972 | Joel, Jr. | |
| 4,144,411 A | 3/1979 | Frenkiel | |
| 5,797,093 A | 8/1998 | Houde | |
| 6,044,257 A | 3/2000 | Boling et al. | |
| 6,226,510 B1 | 5/2001 | Boling et al. | |
| 6,574,484 B1 | 6/2003 | Carley | |
| 6,636,732 B1 | 10/2003 | Boling et al. | |
| 7,092,695 B1 | 8/2006 | Boling et al. | |
| 7,257,413 B2 | 8/2007 | Sheynblat | |
| 7,286,860 B2 | 10/2007 | Harris | |
| 7,315,735 B2 | 1/2008 | Graham | |
| 7,706,831 B2 | 4/2010 | Richardson et al. | |
| 7,890,134 B2 | 2/2011 | Richardson et al. | |
| 2002/0118723 A1* | 8/2002 | McCrady et al. | 375/130 |
| 2005/0085257 A1 | 4/2005 | Laird et al. | |
| 2006/0003809 A1 | 1/2006 | Boling et al. | |
| 2007/0087765 A1 | 4/2007 | Richardson et al. | |
| 2008/0012760 A1 | 1/2008 | Derrick et al. | |
| 2008/0012761 A1 | 1/2008 | Derrick et al. | |
| 2008/0166990 A1* | 7/2008 | Toiv | 455/404.1 |
| 2008/0166992 A1* | 7/2008 | Ricordi et al. | 455/404.2 |
| 2008/0248815 A1* | 10/2008 | Busch | 455/456.5 |
| 2009/0221263 A1* | 9/2009 | Titus et al. | 455/404.1 |
| 2010/0020776 A1* | 1/2010 | Youssef et al. | 370/338 |
| 2010/0159943 A1* | 6/2010 | Salmon | 455/456.1 |
| 2010/0256992 A1* | 10/2010 | Roberts et al. | 705/3 |
| 2011/0003576 A1* | 1/2011 | Sun et al. | 455/404.1 |
| 2011/0111736 A1 | 5/2011 | Dalton et al. | |
| 2011/0151829 A1* | 6/2011 | Velusamy et al. | 455/404.2 |

* cited by examiner

*Primary Examiner* — Charles Appiah
*Assistant Examiner* — Mazda Sabouri
(74) *Attorney, Agent, or Firm* — Kilpatrick Townsend & Stockton, LLP

(57) ABSTRACT

Systems and methods are provided for notifying an extended group of persons that a person has requested assistance from a private response center. In one example, an electronic communication is received from the first person, requesting assistance. One or more potential assisting persons are automatically identified as being in position to render assistance to the first person. An electronic message is sent to the one or more potential assisting persons indicating that the first person has requested assistance. The potential assisting persons may be identified based at least in part on their proximity to the first person, for example based on their interaction with the same cell of a cellular communications network, or based on global positioning system data. The electronic message may contain other information, such as information about the first person. In this way, the original caller may be assisted more quickly than would otherwise occur.

32 Claims, 7 Drawing Sheets

US 8,380,162 B2

EXTENDED EMERGENCY NOTIFICATION SYSTEMS AND METHODS

CROSS-REFERENCE TO RELATED APPLICATION

This application is a continuation of pending U.S. patent application Ser. No. 12/981,822, filed Dec. 30, 2010 which is incorporated herein by reference in its entirety.

BACKGROUND

Nearly all locations within the United States and Canada are now served by "911" emergency telephone service, and many other countries have similar services. In the 911 system, calls to the telephone number 911 are specially routed to a public safety answering point (PSAP), where a specially-trained dispatcher can assess the nature of the emergency, offer assistance, summon emergency services or law enforcement personnel to the source of the call, or provide other services. Many PSAPs are interconnected to allow routing calls and other information between them. The 911 service facilitates rapid response by the appropriate authorities in cases of emergency.

Some private organizations offer telephone-based assistance services, for example navigation assistance, concierge services, health monitoring services, and the like. While these private assistance services are not intended to replace the 911 system, in some cases a client of a private telephone assistance service may call the familiar private assistance service in the event of an emergency, rather than 911. For example, a client of such a private assistance service may carry a device pre-programmed to dial the private assistance service at the touch of a single button. While the private service may recognize an emergency and notify the proper authorities, it may also be desirable to provide assistance in other ways as well.

BRIEF SUMMARY

According to one aspect, a computerized system for responding to electronic messages that request assistance includes a processor and a computer readable memory. The computer readable memory holds processor instructions that, when executed by the processor, cause the computerized system to receive a communication from a first person, the communication including a request for assistance, identify one or more potential assisting persons who are in position to render assistance to the first person and who are not official emergency response personnel, and transmit an electronic notification message to at least one of the one or more potential assisting persons. The second message indicates that the first person has requested assistance. In some embodiments, the potential assisting persons are identified as being in position to render assistance based at least in part on their proximity to the first person. In some embodiments, the communication is received via a cellular communications network, and potential assisting persons are identified as being in proximity to the first person based at least in part on a determination that communications devices registered to the potential assisting persons are interacting with the same cell of the cellular communications network as a device registered to the first person. Potential assisting persons may be identified as in proximity to the first person based at least in part on information from a global positioning system receiver or an assisted global positioning system. In some embodiments, the potential assisting persons are identified based on criteria selected based at least in part on the nature of the request for assistance. The criteria may be based at least in part on information previously supplied by the potential assisting persons. In some embodiments, the electronic message includes information about the location of the first person.

In some embodiments, the instructions, when executed by the processor, further cause the computerized system to access a database listing persons who have opted in to receive the second message, and transmit the electronic message only to potential assisting persons who have opted in. The instructions, when executed by the processor, may further cause the computerized system to access a database listing persons who are associated with the first person, and transmit the second electronic message only to potential assisting persons who are associated with the first person. In some embodiments, the electronic message is transmitted to at least one potential assisting person in the form of a short message service message or in the form of a telephone call. In some embodiments, the electronic message includes a digital image. The electronic message may include information about the first person. The electronic message may include information about a likely location of the first person.

In some embodiments, the instructions, when executed by the processor, cause the computerized system to receive a return telephone from at least one of the potential assisting persons, and connect the return telephone call to a customer service representative. In some embodiments, the instructions, when executed by the processor, cause the computerized system to receive information about an identifiable wireless signal being broadcast by a device associated with the first person, and include in the notification message information about the identifiable wireless signal.

According to another aspect, a method for operating a service center includes receiving an electronic communication from a first person, the electronic communication including a request for assistance, and automatically identifying one or more potential assisting persons who are in position to render assistance to the first person and who are not official emergency response personnel. The method further includes transmitting, over a communications network, an electronic notification message to at least one of the one or more potential assisting persons. The second message indicates that the first person has requested assistance. In some embodiments, automatically identifying one or more potential assisting persons who are in position to render assistance to the first person includes identifying the potential assisting persons based in part on their proximity to the first person. In some embodiments, the communication is received via a cellular communications network, and automatically identifying one or more potential assisting persons who are in position to render assistance to the first person includes indentifying the potential assisting persons based at least in part on a determination that communications devices registered to the potential assisting persons are interacting with the same cell of the cellular communications network as the first person. In some embodiments, automatically identifying one or more potential assisting persons who are in position to render assistance to the first person includes indentifying the potential assisting persons based at least in part on information from a global positioning system receiver or an assisted global positioning system. The electronic message may include information about the location of the first person.

In some embodiments, the method further includes accessing a database listing persons who have opted in to receive the second message, and transmitting the electronic message only to potential assisting persons who have opted in. In some embodiments, the method further includes accessing a database listing persons who are associated with the first person, and transmitting the second electronic message only to potential assisting persons who are associated with the first person. Transmitting the electronic message may include transmitting a short message service message or placing a telephone call. Transmitting the electronic message may include transmitting an electronic message comprising a digital image. In some embodiments, transmitting the electronic message includes transmitting an electronic message comprising information about the first person. Transmitting the electronic message may include transmitting an electronic message including information about a likely location of the first person.

In some embodiments, the method further includes receiving a return telephone from at least one of the potential assisting persons, and connecting the return telephone call to a customer service representative. In some embodiments, the method further includes receiving information about an identifiable wireless signal being broadcast by a device associated with the first person, and including in the notification message information about the identifiable wireless signal.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, systems, structures, and other components may be shown as components in block diagram form in order not to obscure the embodiments in unnecessary detail. In other instances, well-known processes, procedures and techniques may be shown without unnecessary detail in order to avoid obscuring the embodiments.

Also, it is noted that individual embodiments may be described as a process which is depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but could have additional steps not included in a figure. Furthermore, embodiments may be implemented by manual techniques, automatic techniques, or any combination thereof.

Figure 1:
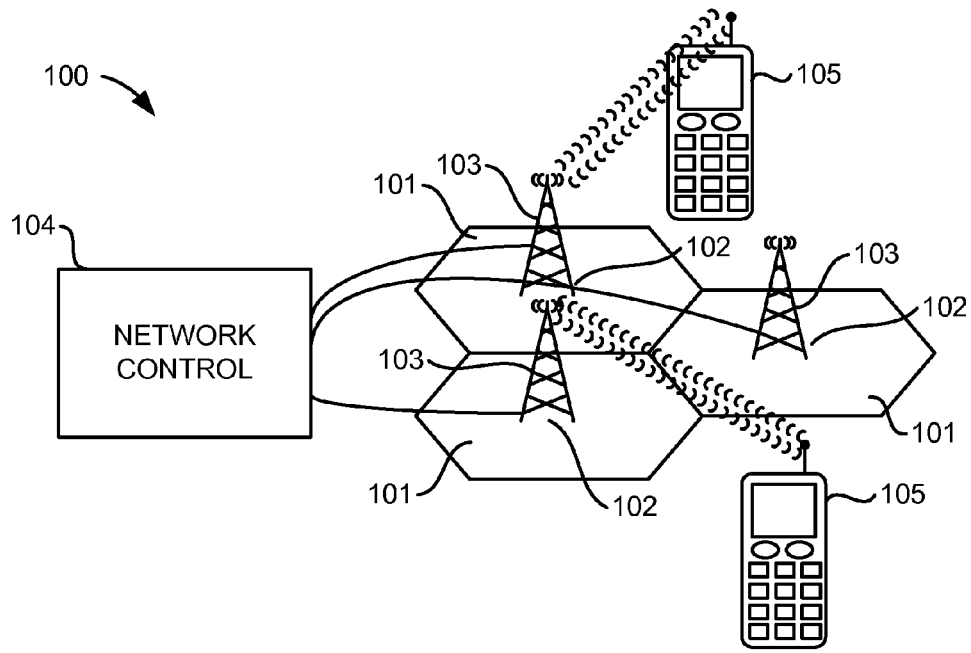
FIG. 1 is a simplified schematic diagram of a cellular telephone network.

FIG. 1 is a simplified schematic diagram of a cellular telephone network 100. Cellular networks are an especially efficient way to provide mobile telephone service. Each cell 101 is served by a base station 102, which often includes an antenna mounted on a tower 103. Each cellular telephone active in a particular cell can bidirectionally interact with the base station of the cell, enabling full duplex communication of data and/or voice. Each cell 101 is capable of communicating with mobile telephones 105 within the respective cell 101 according to a physical interface scheme (e.g., CDMA, LTE, GSM, GPRS, WiMax, etc.). Each base station 102 typically is capable of communicating simultaneously with several dozen different mobile telephones 105.

Adjacent cells 101 use different frequencies or coding to avoid interference. In this way, many mobile telephones can be supported using a limited spectra. The size and density of the cells 101 may be determined in part by the demand for service. While only three cells 101 are shown in FIG. 1, many cells 101 may be present. Special hand-off protocols may be used for maintaining communication with a particular telephone that moves from one cell 101 to another during a call.

As shown in FIG. 1, each base station 102 communicates with a network controller 104. It will be understood that FIG. 1 is highly simplified, and network controller 104 represents a wide array of hardware, software, and other components performing a wide variety of functions. For example, network controller 104 may route calls between cells 101 and outside telephone providers, monitor telephone usage, maintain billing records for individual telephone accounts, perform diagnostic tests, and perform many other functions.

Figure 2:
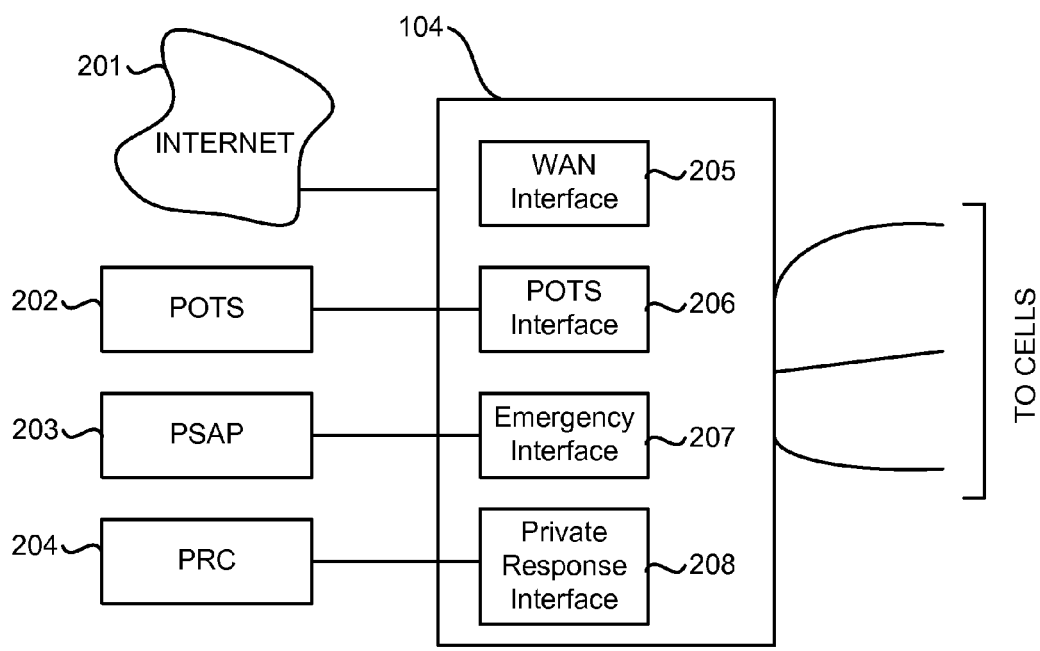
FIG. 2 is a simplified block diagram of network controller illustrating interfaces in accordance with an embodiment.

Network controller 104 may also include interfaces between network 100 and other networks, organizations, or services. For example, FIG. 2 is a block diagram of network controller 104, still highly simplified, illustrating interfaces 205, 206, 207, 208 to the Internet 201, a plain old telephone system (POTS) 202, a PSAP 203, and a private response center (PRC) 204. Other interfaces to location services, data services, billing systems, etc. are typical, but not shown.

WAN interface 205 connects network 100 with the Internet 201. The Internet 201 is a global system of interconnected computer networks, and enables digital communication between computers. Applications of the Internet 201 include the carrying of electronic mail, audio and video feeds, and other kinds of digital messages. One especially popular use of the Internet 201 is for the hosting and viewing of interlinked documents on the World Wide Web. Many modern mobile telephones, including cellular telephones of the kind supported by network 100, include the capability to access documents and communications through the Internet 201, for example sending and receiving electronic mail and viewing web pages. Other embodiments could us a wide area network (WAN) separate from or tunneled through the Internet 201.

POTS interface 206 connects network 100 with the plain old telephone system (POTS) 202. POTS 202 comprises, for example, a large number of traditional wireline telephones and other communications equipment, as well as the infrastructure required to support them. Many residential and small business telephones are part of POTS 202, which may still support telephone hardware that is decades old. POTS interface 206 enables users of mobile telephones that are part of network 100 to call telephones that utilize POTS 202, and vice versa.

Emergency interface 207 connects network 100 to PSAP 203, so that calls to the 911 emergency number made by mobile phone users on network 100 can be routed to a PSAP 203 or routed between multiple PSAPs 203. The PSAP 203 may be additionally served by POTS 202, or by another system.

Private response interface 208 connects network 100 to private response center 204. For example, private response center 204 may be operated by a service provider who offers personalized assistance to clients who subscribe to the service. In some embodiments, the service provider may offer personal health management advice, concierge services, navigational assistance, technical support for telephones used in conjunction with the service, or other kinds of personalized services deliverable by telephone. Private response center 204 may be staffed by customer service representatives who answer inquiries from clients of the service. Such a service may especially appeal to clients with health or other impairments. For example, the service could include weekly or daily calls to the client for verification that the client is doing well, and if not, the customer service representative may offer to contact a family member, health care provider, or other resource that may be helpful to the client. The service could include these and other services sold as a package.

Private response center (PRC) 204 is not intended to be a substitute for the PSAP 203. A client of the service offered by private response center 204 would still be expected to dial 911 in the event of an emergency.

In one example scenario, the service provider that operates private response center 204 may also be a cellular telephone service provider, and may offer a private assistance service as an adjunct to cellular telephone service. The private response center 204 can be contacted for non-emergency service through a phone number, speed dial or other shortcut, for example by activating a 5 and * key combination. The connection between network controller 104 and private response center 204 is schematic. The actual connection could be by way of the Internet 201, a wireless connection, a voice-over-Internet-protocol (VOIP) connection, a cellular telephone connection, or private response center 204 could be reached through POTS 202, or any other suitable connection method that enables a telephone user to reach private response center 204 by calling a telephone number. Private response center 204 may be reachable via multiple methods.

Figure 3A:
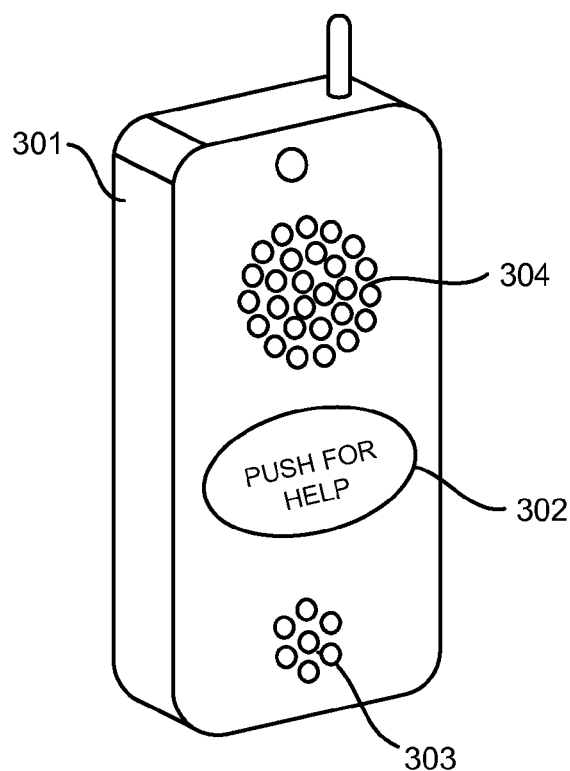
FIGS. 3A and 3B illustrate exemplary communications devices.
Figure 3B:
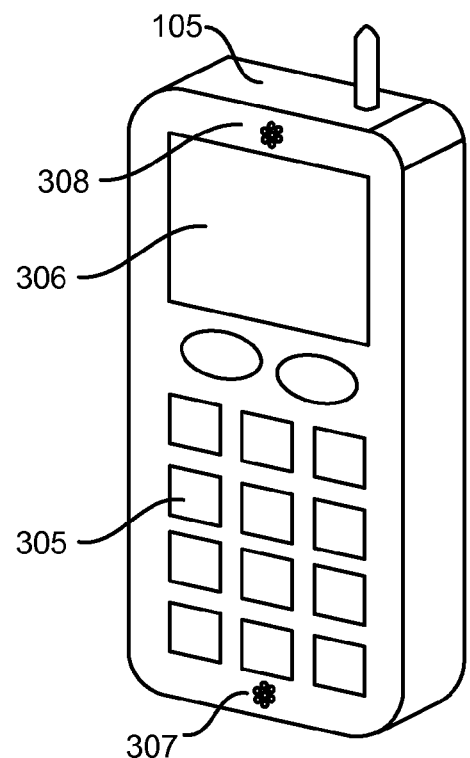

FIGS. 3A and 3B illustrate communications devices that may be used in embodiments. FIG. 3A illustrates a specialized communications device 301 that may be especially useful for some clients of private response center 204. Exemplary communications device 301 may internally be a fully-featured cellular telephone, but has a simplified input interface comprising only one button 302. Communications device 301 may also be referred to as a "personal security device" or an "emergency communicator." A client of private response center 204 may wear communications device 301 on his or her person, and can use it to contact private response center 204 whenever assistance is needed. For example, communications device 301 may be configured to dial private response center 204 when button 302 is pressed. This greatly simplified input interface may be especially helpful to clients with impairments such as poor vision or coordination that make it difficult to operate a conventional cellular telephone that has many small keys. The single-button interface assures that private response center 204 will be called without the client having to press a sequence of keys. In the event of an emergency, private response center can route the call to the proper authorities. Communications device 301 further includes a microphone 303 and a speaker 304, enabling telephone or telephone-like communication.

FIG. 3B illustrates an exemplary mobile telephone 105 in more detail. Mobile telephone 105 includes a keypad 305 for dialing, text input, or other uses. A display 306 displays information of use to the user, including menus for operating mobile telephone 105, and textual and alphanumeric information such as dialed numbers and sent and received text messages, and the like. Display 306 may also display graphical information such as digital photographs, maps, documents, or other kinds of information. Mobile telephone 105 may include a camera (not shown) for the capture of digital photographs, which may be stored in mobile telephone 105, sent to other persons, or otherwise distributed. A microphone 307 and speaker 308 enable telephone communication. Mobile telephones of many other configurations and having may other features may also be used. It is also to be understood that embodiments may utilize other kinds of communication devices, for example, pagers, portable computers, tablet computers, or personal digital assistants. In some embodiments, non-portable devices may be used, for example a wireline telephone, desktop computer, or other device.

Figure 4:
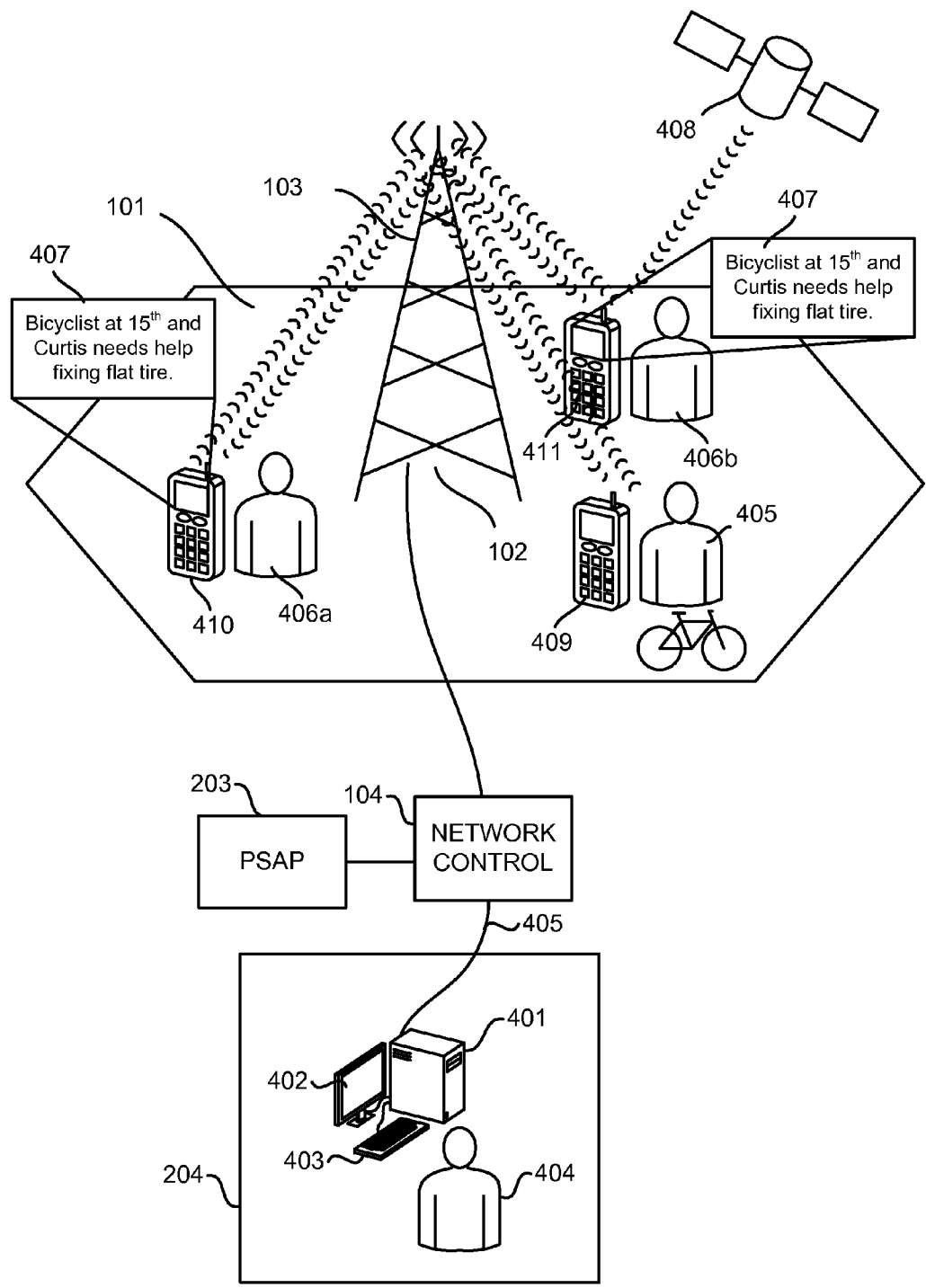
FIG. 4 illustrates entities involved in a typical scenario in accordance with an embodiment.

FIG. 4 illustrates the entities involved in a typical scenario in accordance with an embodiment. As shown in FIG. 4, private response center 204 preferably comprises a computer system 401 that facilitates many of the functions of private response center 204. Computer system 401 may include a display screen 402 and an input device 403 for displaying information to and receiving inputs from a service representative 404. Input device 403 may be, for example, a keyboard, mouse, or other kind of input device or a combination of input devices. While computer system 401 is depicted in FIG. 3 as a single, stand-alone computer, computer system 401 may include multiple interconnected computers, which may be collocated or widely distributed. Computer system 401 may include various forms of data storage, including volatile and nonvolatile memory, and long term data storage. At least some of the data storage holds instructions executable by a processor of computer system 401 to perform functions in accordance with embodiments. Alternatively, computer system 401 may be an Internet server, hosting a website that provides the service according to embodiments. In the example of FIG. 4, private response center 204 is connected to network controller 104 through a telephone connection 405, which may be a wireline connection, wireless connection, the Internet, or any other connection that enables private response center 204 to communicate through network controller 104. Many other arrangements are possible. For example, private response center 204 may be able to make telephone calls over the Internet 201 using a voice-over-IP system.

As is explained above, a client 405 of private response center 204 may call private response center 204 in a variety of scenarios. For example, the client may be driving and may wish to obtain driving directions, or the name of a nearby restaurant. However, the client may also call private response center 204 rather than 911 in the event of an emergency, such as an auto accident, a fall in the home, a sudden medical emergency, or other situation. The client may simply be comfortable with calling private response center 204, or may only have access to a communications device such as communications device 301 that is pre-programmed to call private response center 204. If a call relates to an emergency, then customer service representative 404 may recognize that the client has an emergency, and may redirect the client's call to PSAP 203. Or customer service representative 404 may set up a conference call that includes the client, customer service representative 404, and PSAP 203 so that customer service representative 404 can advocate on behalf of the client. For example, customer service representative 404 may be able to access information about the client, such as a list of medications the client is taking, and provide the information to the emergency services personnel at PSAP 203.

In some cases, it may also be desirable to notify other persons who are in a position to be of assistance to the caller. As shown in FIG. 4, client 405 may call private response center 204 using a mobile telephone 409. Mobile telephone 409 may communicate via antenna 103 with base station 102, which in turn communicates with network controller 104, which communicates with private response center 204. Many other persons, represented by persons 406a and 406b, may be in position to render assistance to client 405 and may be willing to help if they knew assistance was needed. Potential assisting persons 406a and 406b may be carrying mobile communications devices such as devuces 410 and 411.

In accordance with embodiments, private response center automatically identifies persons who may be in position to render assistance to client 405, and who are not official emergency response personnel such as police, fire, or emergency medical personnel who would be summoned by PSAP 203. Private response center then transmits an electronic notification message to the identified potential assisting persons, in the hope that one or more of them will act as Good Samaritans and come to the aid of client 405. In some embodiments, the electronic message may be sent in addition to a notification of PSAP 203. In that case, a nearby person may be able to render assistance to client 405 until emergency services personnel arrive. Other embodiments may include situations where no emergency exists (and PSAP 203 is consequently not notified) but where other non-emergency assistance would be helpful.

Figure 5:
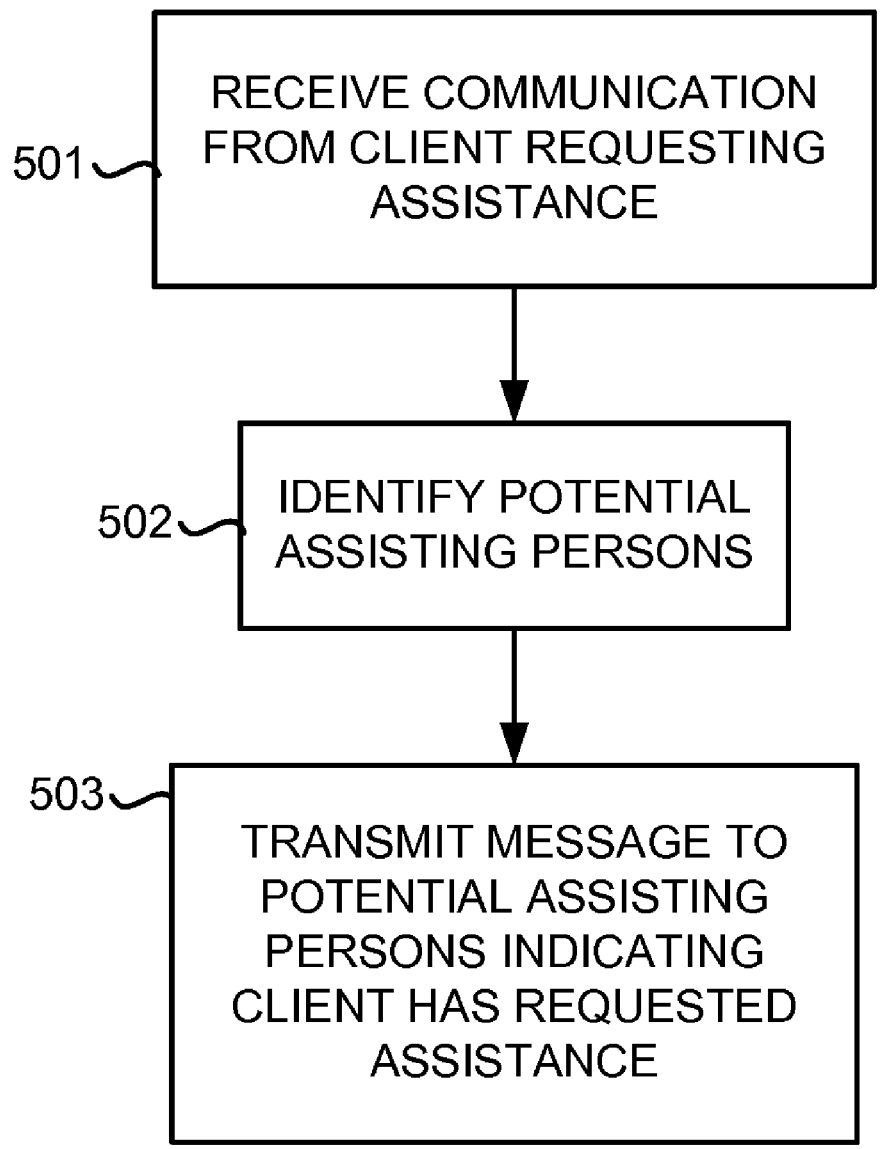
FIG. 5 illustrates the steps of a method in accordance with embodiments.

FIG. 5 illustrates the steps of a method performed at private response center 204, in accordance with embodiments. In step 501, a communication is received from a client requesting assistance. In step 502, one or more potential assisting persons are identified who may be in position to render assistance. In step 503, a message is transmitted to one or more of the identified persons, indicating that the client has requested assistance. Many additions and variations to this basic process are possible, as discussed below.

In some embodiments, potential assisting persons 406a and 406b may be identified based in part on their proximity to client 405, since persons near client 405 may best be in position to render assistance. Any suitable method may be used to determine proximity, and different methods have different advantages and disadvantages.

In some embodiments, when client 405 contacts private response center 204 using a cellular telephone, information may be available about the location of the particular cell 101 that is handling the call. Information may also be available indicating which other devices are within or interacting with the same cell. This may be especially true if the operator of private response center 204 is also a cellular network operator. In some areas, where the cells are small and therefore cover the landscape densely, two devices that are interacting with the same cell may be no more than a few hundred yards apart, and may be much closer.

It should be noted that while embodiments are described for ease of understanding using language relating to "persons", in practice, the communications involved may actually be sent to particular devices, rather than to individual persons. For the purposes of this disclosure, indentifying a "person" in proximity to another person is intended to include identifying a particular communications device that is in proximity to another communications device that initiated a call. Similarly, sending a message to a "person" is intended to include sending a message to a device registered to that person. Because mobile devices are typically registered to and carried by particular people, it is natural to think of sending a message to a particular identified device as sending a message to the person to whom the device is registered.

Referring again to FIG. 4, in an example scenario client 405 may require assistance and may call private response center 204 using mobile telephone 409. For example, a bicycle that client 405 has been riding may develop a flat tire. Client 405 calls private response center 204 and describes the situation. Private response center then identifies potential assisting persons in the area (that is, identifies the mobile devices of other persons in the area) such as persons 406a and 406b, and transmits an electronic message to those persons. The electronic message may be, for example, a short message service (SMS) or "text" message or another kind of message. Example message 407 is a text message describing the situation and notifying persons 406a and 406b.

In other embodiments, the persons may be identified as being in proximity to client 405 in other ways. For example, some mobile telephones include global positioning system (GPS) receivers. The GPS system uses a constellation of satellites 408 in low earth orbit to transmit signals usable by a suitable receiver to determine its position with a precision of a few yards or less. (While only one satellite 408 is shown in FIG. 4, typically signals from three or more satellites are used in a process of triangulation to determine position.) A mobile telephone 105 that includes a GPS receiver may transmit its location (the location of client 405) to private response center 204, which may relay the information to private response center 204. The locations of other devices (and their owners) in the area may also be derived from GPS data, for example if other devices have recently reported their positions for some reason.

Different location methods have different advantages and disadvantages. For example, noting which cell a particular device is interacting with can be done almost instantly, but does not give a very precise fix of the location of the device. Locating a device using GPS gives a very precise indication, but may take several minutes or more, if a new satellite fix is needed. In some systems, assisted GPS (AGPS) may be used. AGPS utilizes other information, for example information from the cellular network, in combination with GPS information to provide location information that may then be obtained more quickly than by GPS alone, and more accurately than by cellular network information alone.

In other embodiments, client 405 may call private response center 204 from a wireline telephone. In that case, the location of client 405 may be determined from the location of the wireline telephone, which may be registered as being at a fixed address, for example.

In some cases, it may not be desirable to broadcast notifications to all persons identifiable as being in the vicinity of client 405, and steps may be taken to target the notifications to particular recipients. For example, subscribers to the telephone network controlled by network controller 104 may be invited to "opt in" to receive requests for assistance, and messages such as message 407 may be sent only to (devices owned by) persons who have opted in. A list of persons opting in to the receipt of notification messages may be kept in a database, for example at computer system 401. In another example, notifications may be sent only to other clients of private response center 204, or to other clients of private response center 204 who have opted in to receive such notifications.

In other embodiments, potential assisting persons may be identified based on other criteria, instead of or in addition to their proximity to client 405. For example, persons may be identified as potential assisting persons based at least in part on their membership in an affinity group related to client 405, or based on some other association with client 405. Many different kinds of affinity groups are possible. For example, client 405 may provide a list persons such as friends and family members to whom notification messages should be sent. In another example, persons in a family calling plan that includes client 405 may be considered an affinity group. In another example, persons designated as friends of client 405 in a social networking environment such as Facebook may be considered an affinity group. In another embodiment, private response center 405 may broadcast a notification message to friends of client 405 within the social networking environment, in addition to or instead of sending the notification message to potential assisting persons by other means.

Persons in an affinity group need not be in proximity to client 405. For example, client 405 may designate family members in different states to receive notification messages.

In other embodiments, the criteria by which potential assisting persons are identified may vary depending on the nature of the request for assistance or other factors. For example, some kinds of assistance require proximity—such the flat tire scenario described above. In that situation, only persons in proximity to client 405 may be notified of the assistance request, even though client 405 may have supplied a list of persons to contact that includes persons in other states. Or, if client 405 has contacted private response center 204 simply to have a message relayed to friends and family, proximity would not be a factor.

In another scenario, client 405 may be experiencing medical symptoms, and may need medical attention. In this case, private response center 204 (in addition to possibly notifying professional emergency response personnel), may tailor its notification message and may select potential assisting persons to the situation. For example, persons who have opted in to receiving notification messages may have supplied profile information about themselves. Private response center 204 may be able to identify specific persons near client 405 who have medical training, and may select those persons to receive the notification message. Similarly, some persons opting in to receive notification messages may indicate that they have other skills, such as mechanical training. In that case, private response center 204 may select those persons to receive notification messages relating car trouble or the like.

Besides an SMS or text message as described above, notification messages may take other forms. For example, potential assisting persons could be notified by telephone call that assistance is needed.

In some embodiments, a notification message may include information about client 405. For example, a notification message could include a digital photograph of client 405, to aid potential responders in finding and identifying client 405. In this case, client 405 may have previously supplied a photograph to private response center 204, and may have given permission for it to be distributed in notification messages. This could be performed in conjunction with the enrollment of client 405 in the service provided by private response center 204. The photograph may have been included as part of a personal profile that is provided by client 405 to private response center 204 prior to using the service. In other embodiments, client 405 may take a photograph of himself or herself and upload it as part of the initial call to private response center 204. Or client 405 could take a photograph of his or her surroundings and provide the photograph to private response center 204, to assist private response center 204 in determining the location of client 405. Such a photograph may also be forwarded to potential assisting persons. In other embodiments, a notification message could include medical information about client 405, for example "Person requesting assistance is diabetic."

In other embodiments, one or more of the potential assisting persons may provide return communication to private response center 204 in response to receiving a notification message. For example, one or more recipients of a notification message may send an SMS message to private response center 204 indicating that they are willing to give assistance, or even that they are already responding. In another scenario, a potential assisting person may place a telephone call to private response center 204 to request more information about client 405, to request more information about how to assist client 405, or for other reasons. Customer service representative may accept one or more of these calls, and could place one or more of them into a conference with client 405, in which case customer service representative 404 may act as a coordinator to guide responders to client 405 and to offer additional assistance.

Depending on the precision with which devices can be located by computer system 401, potential assisting persons such as persons 406a and 406b receiving notification messages indicating that client 405 has requested assistance may be relatively far from client 405, and it may not be immediately apparent to them how to find client 405. For example, if potential assisting persons are identified as interacting with the same cell of a cellular telephone network as client 405, the notification message recipients could be separated from client 405 by hundreds of yards or more. A variety of techniques may be employed, alone or in combination, to aid potential assisting persons in finding client 405. Some of these techniques may be especially helpful when client 405 has not provided detailed information about his or her location that could be included in the notification message.

In one example, a notification message may include a digital map, showing the location of client 405, to assist potential assisting persons in locating client 405. This location technique may be especially useful if the communication device used by client 405 to call private response center 204 includes a GPS receiver, and can supply GPS coordinates to private response center 204. Such a map could be updated dynamically, for example as either the recipient of the message or client 405 moves, the map could be updated. The map may also include the locations of other potential assisting persons, for example so that a recipient may judge whether he or she is best in position to render assistance, or to aid responders in locating each other so that they can combine their efforts to render assistance. If a person responding to a notification message has a properly equipped electronic device, it may display a compass, provide navigational directions, or otherwise assist the responder in locating and moving toward client 405.

In some embodiments, a notification message sent by private response center 204 may include information about a likely location of client 405. For example, upon in enrolling in the service provided by private response center 204, a client may have provided profile information indicating the location of his or her home, office, and other places frequently visited by the client. Even if private response center 204 is unable to obtain a precise fix on the location of client when the client calls for assistance, for example, if private response center 204 relies on the location of the cell from which the client calls, private response center 204 may wish to include information from the client's profile indicating the client's home, office, or other address, as these are likely places for the client to be.

In other embodiments, the client may have previously opted into a tracking service, wherein private response center periodically receives location fixes from the client's telephone or other device. These prior readings could be analyzed to determine other places frequented by the client. In one example scenario, a client may call for assistance from within a cell that is not near his or her home or office, but private response center 204 may be able to determine that within the cell from which the client is calling is another location that the client frequently visits, such as the home of a family member. A notification message to potential assisting persons could list the address of the family member's home as a possible location of client 405.

In other embodiments, a likely location for client 405 may be determined based on location information collected from mobile device users other than client 405. This kind of information may be especially helpful in sparsely populated areas. For example, private response center may periodically collect location information from a number of clients or other mobile device users, who may have opted in to a tracking service. This aggregate location data (which may be anonymous) may be collected into a "heat map" or similar representation showing, within a particular cell 101 or other defined area, where people are likely to be, and therefore where client 405 is more likely to be as compared with areas where few or no location readings have been recorded. This information may be included in a notification message, to increase the likelihood that a potential assisting person will be able to locate client 405. For example, in a rural area, a notification message could include a message such as, "Hiker has sprained ankle. Requests help getting back to camp. Possible location is between Deer Lake and Antelope point."

In other embodiments, various capabilities of the wireless devices carried by client 405 and potential assisting persons in the area may be exploited to provide additional information to the potential assisting persons about the location of client 405. Wireless devices by their nature emit and detect radio signals. The strength of a radio signal diminishes with distance away from its source. For example, in an open area, the signal strength may decay according to the well-known inverse square law, under which the relative strength of a signal is inversely proportional to the square of the distance from the signal source. Accordingly, the measured strength of a received radio signal can provide at least relative information about the distance between the source of the signal and the receiver.

Mobile devices may utilize any of several kinds of wireless signals. For example, a cellular telephone, in addition to communicating with the cellular telephone network, may include one or more transceivers for communicating with other devices in other ways. In one example, a cellular telephone may include a modem for communicating in accordance with the IEEE 802.11 specification. Certain interoperable implementations of the IEEE 802.11 standard are ratified by the Wi-Fi Alliance, and are generally referred to as "Wi-Fi™". Communications according to IEEE 802.11 typically utilize frequencies allocated in 14 channels between 2.412 and 2.484 GHz in the electromagnetic spectrum, and typically operate over distances of up to about 100 to 400 feet. Wi-Fi is often used to wirelessly connect a mobile device to an access point to enable use of the Internet by the mobile device. The access point in that kind of use is usually at a fixed location.

It is also possible to use Wi-Fi communication for direct communication between mobile devices, without the use of an intermediate access point. For example, in accordance with a protocol known as "Wi-Fi Direct™", devices can negotiate to determine which of them will act as an access point, and then communicate directly between them.

Another example of direct communication between devices utilizes the Bluetooth protocol. Bluetooth devices are certified by the Bluetooth Special Interest Group, and operate in a set of 79 frequency bands in the range 2402-2480 MHz. Depending on the transmitter power class, Bluetooth communications may have a range limited to a few feet, or may have a range up to 100 meters.

A particular device may include any combination of these and other kinds of wireless communications capabilities. Commonly, a device can measure and indicate the relative strength of a wireless signal it receives from another device. This relative strength can be exploited to help guide a potential assisting person to client 405. The device used by client 405, the device used by a potential assisting person, or both may include application programming that assists in guiding the potential assisting person to client 405, although in some embodiments special programming is not necessary.

Figure 6:
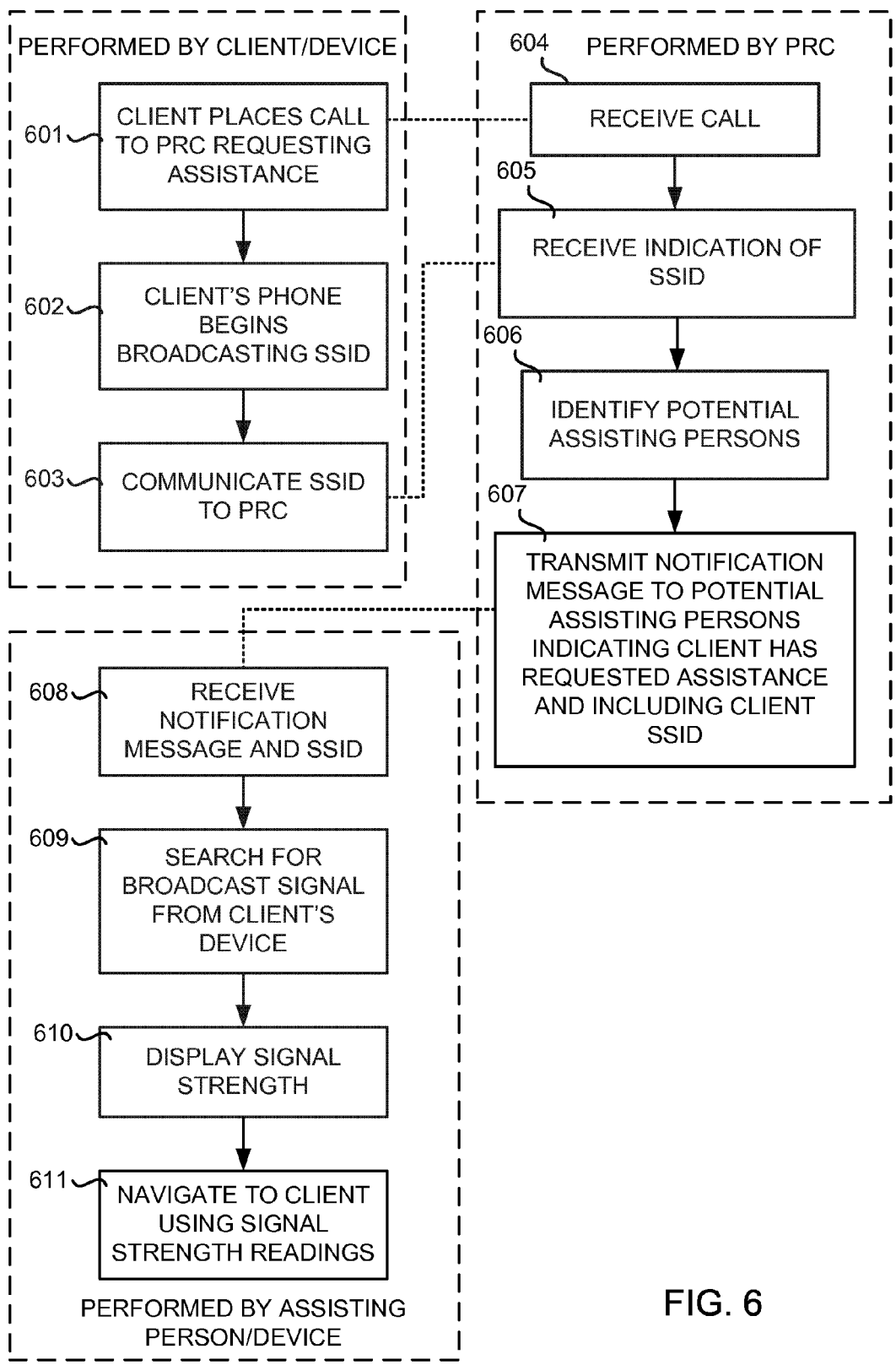
FIG. 6 illustrates steps that may be performed in a typical scenario in accordance with embodiments.

FIG. 6 illustrates a steps that may be performed in a typical scenario, to aid a potential assisting person to locate client 405 using wireless capabilities built in to their respective mobile devices. In step 601, client 405 places a call to private response center 204, requesting assistance. For example, client 405 may use mobile telephone 409 to call private response center 204. For the purposes of this example, mobile telephone 409 is assumed to have a direct wireless communication capability, such as Wi-Fi Direct or Bluetooth capability. At step 602, mobile telephone 409 begins broadcasting an identifiable wireless signal. For example, mobile telephone 409 may have Wi-Fi Direct capability, and may configure itself as an access point and begin broadcasting its service set identifier (SSID). The broadcast may be initiated in any of a number of ways. For example, client 405 may instruct mobile telephone 409 to begin broadcasting, using application software installed on mobile telephone 409. Or mobile telephone 409 may be specially programmed such that private response center 204 can send coded messages to control the operation of mobile telephone 409. For example, private response center 204 may send an SMS message that is interpreted by mobile telephone 409 as an instruction to begin broadcasting its SSID. In other embodiments, private response center 204 may send a coded message using dual-tone multiple-frequency (DTMF) tones communicated to mobile telephone 409 over the voice channel. In step 603, information about the identifiable wireless signal, for example the SSID of the client's device, is communicated to private response center 204. This communication may also be performed in any of a number of ways. For example, mobile telephone 409 may send a return SMS message to private response center 204 containing the SSID, the SSID may be encoded in a series of DTMF tones on the voice channel, or client 405 may simply tell customer service representative 204 the SSID. Other methods of initiating the broadcast of an identifiable wireless signal and communicating with private response center 204 may be envisioned.

At step 604, private response center 204 receives the call placed by client 405. At step 605, private response center 204 receives information about the identifiable wireless signal being broadcast by mobile telephone 409, for example the SSID being broadcast. At step 606, private response center 204 identifies potential assisting persons in proximity to client 405. The identification may be performed by any method such as the methods described above.

Figure 7:
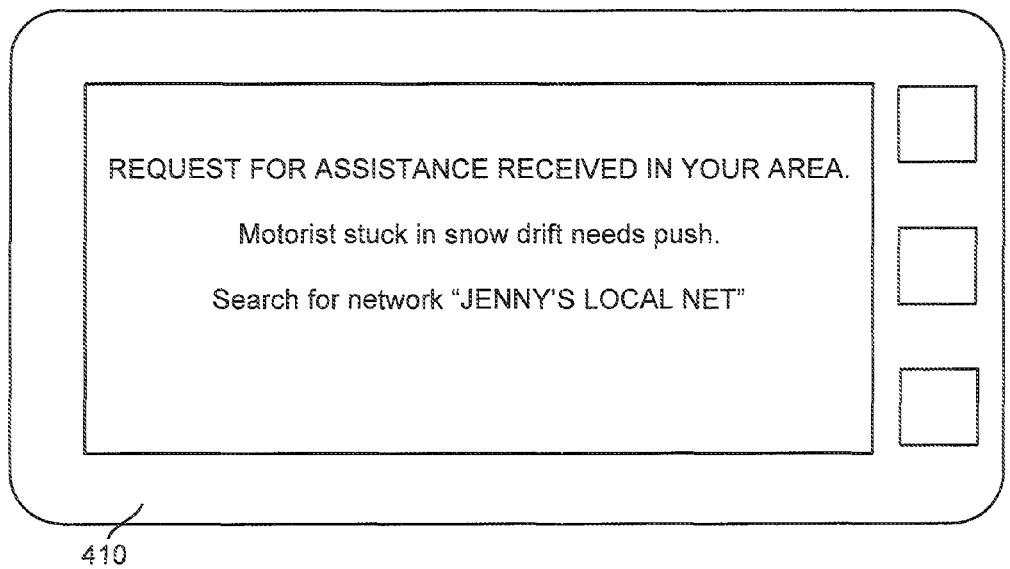
FIG. 7 illustrates an example notification message.

At step 607, private response center 204 transmits an electronic notification message to the identified potential assisting persons 406a and 406b. The message includes notification that client 405 has requested assistance, and also provides information about the signal being broadcast by mobile telephone 409. In this example, the notification message includes the SSID being broadcast, and instructs the recipient to search for that SSID. An example of such a message is shown in FIG. 7.

Figure 8:
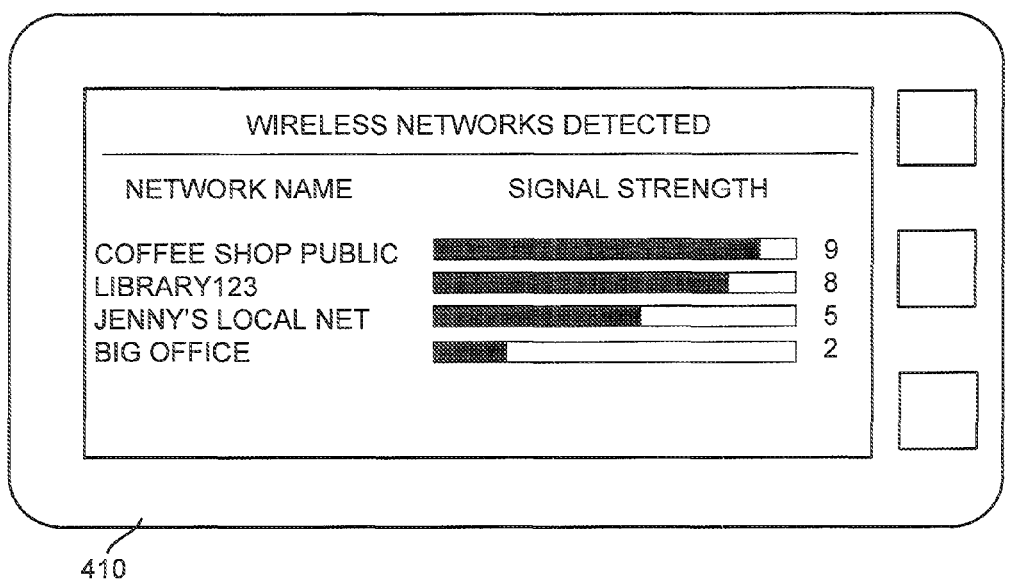
FIG. 8 illustrates an example display showing wireless signal strengths.

In step 608, one of the potential assisting persons, for example person 406a, receives the notification message, including the SSID being broadcast by mobile telephone 409. At step 609, the potential assisting person, using his or her mobile device, searches for the signal being broadcast by mobile telephone 409. For example, application software may be activated that lists and classifies signals received in the area. In step 610, the strength of the broadcast signal is displayed. An example of a display that may be generated on mobile device 410 of potential assisting person 406a is shown in FIG. 8. At step 611, the potential assisting person navigates to client 405 using the signal strength readings. For example, the person may move in different directions to see if the pertinent signal strength reading increases or decreases, and based on the result, can identify the direction to travel to reach client 405. In some scenarios, for example within a high-rise building, vertical movements may be required to reach client 405.

Similar kinds of location assistance can be provided using Bluetooth or other kinds of direct wireless communication schemes.

Once client 405 has been helped, private response center 204 may send a second notification message indicating that assistance is no longer needed.

Figure 9:
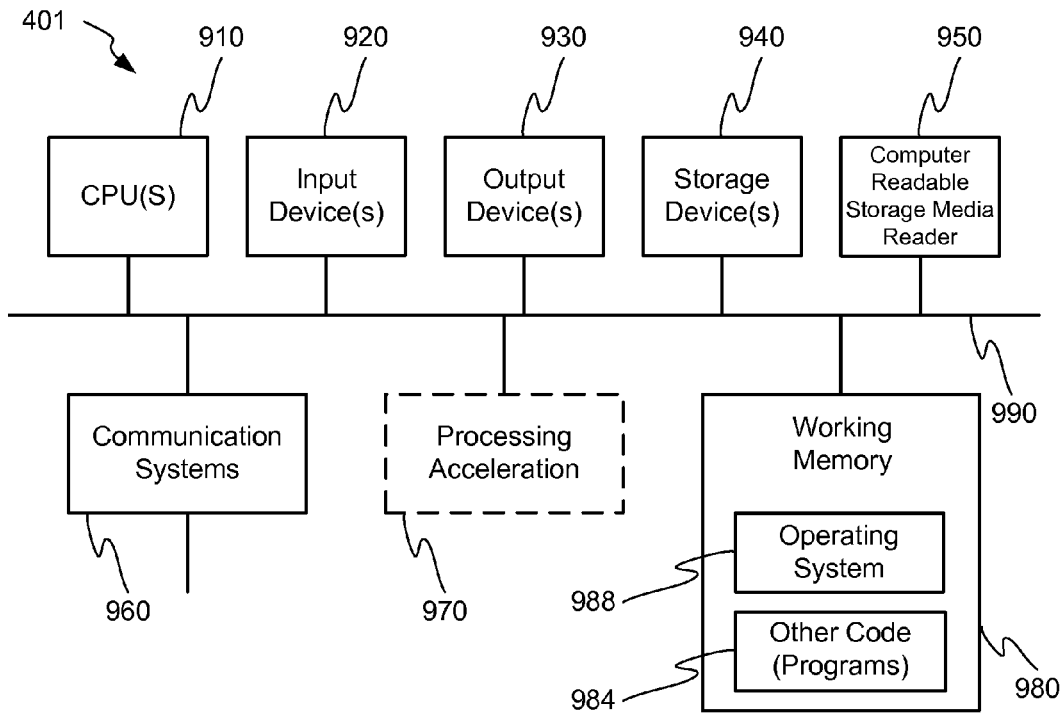
FIG. 9 illustrates a simplified block diagram of an exemplary computer system.

FIG. 9 illustrates a simplified block diagram of an exemplary embodiment of the internal structure of computer system 401. The computer system 401 is shown comprising hardware elements that may be electrically coupled via a bus 990. The hardware elements may include one or more central processing units 910, one or more input devices 920 (e.g., input devices 403, etc.), and one or more output devices 940 (e.g., a display 402, a printer, etc.). The computer system 401 may also include one or more storage device(s) 940. By way of example, storage device(s) 940 may be disk drives, optical storage devices, solid-state storage device such as a random access memory ("RAM") and/or a read-only memory ("ROM"), which can be programmable, flash-updateable and/or the like.

The computer system 401 may additionally include a computer-readable storage media reader 950, a communications system 960 (e.g., a modem, a network card (wireless or wired), an infra-red communication device, Bluetooth™ device, cellular communication device, etc.), and working memory 980, which may include RAM and ROM devices as described above. In some embodiments, the computer system 401 may also include a processing acceleration unit 970, which can include a digital signal processor, a special-purpose processor and/or the like.

The computer-readable storage media reader 950 can further be connected to a computer-readable storage medium, together (and, optionally, in combination with storage device (s) 940) comprehensively representing remote, local, fixed, and/or removable storage devices plus storage media for temporarily and/or more permanently containing computer-readable information. The communications system 960 may permit data to be exchanged with a network, system, computer and/or other component described above.

The computer system 401 may also comprise software elements, shown as being currently located within a working memory 980, including an operating system 984 and/or other code 988. It should be appreciated that alternate embodiments of a computer system 401 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 401 may include code 988 for implementing any or all of the function of the various elements of the architecture as described herein. For example, software, stored on and/or executed by a computer system such as system 401, can provide some of the functions of private response center 204 such as those discussed above. Methods implementable by software on some of these components have been discussed above in more detail.

Figure 10:
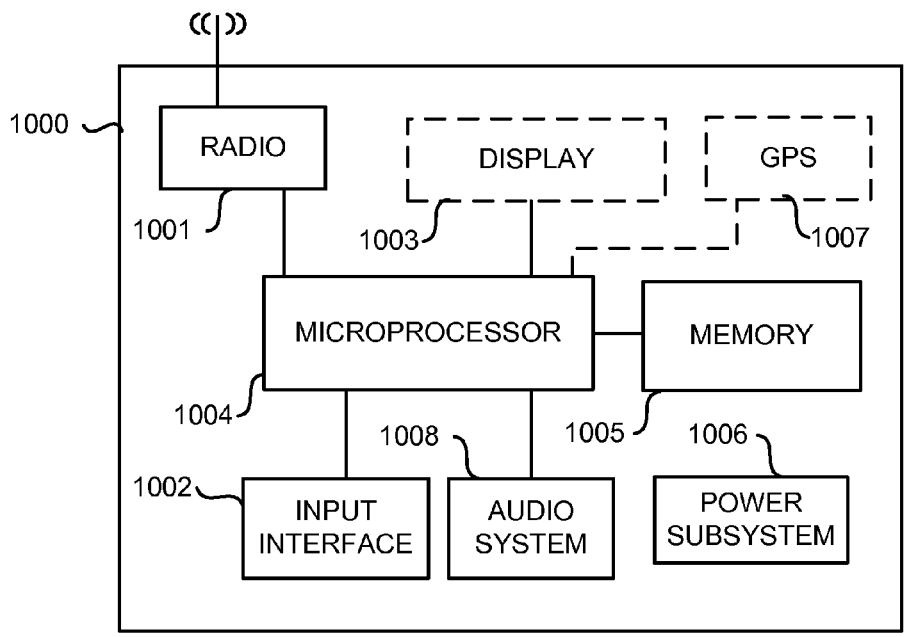
FIG. 10 illustrates a simplified block diagram of a communications device suitable for use in embodiments.

FIG. 10 illustrates a simplified block diagram of a communications device 1000, suitable for use in embodiments. Communications device 1000 may be a simplified fob such as communications device 301, may be a mobile telephone such as mobile telephone 105, or may be another kind of communications device. Communications device 1000 includes a radio transceiver 1001 for communicating with network 100, an input interface 1002 for receiving inputs from the user of communications device 1000. Input interface 1002 may include a single button or a multi-key keypad, and may include a microphone, an accelerometer, or other input devices. A display 1003 may optionally be included for communicating information to the user. Display 1003, if included, may comprise any means of visually communicating information to the user. For example, display 1003 may comprise a backlit or passive liquid crystal display (LCD) or another kind of display capable of showing graphical or alphanumeric information. Display 1003 could comprise a simple set of indicator lights, for example made of light emitting diodes or another kind of light source. Many other kinds of displays are possible. The operation of communications device 1000 is controlled by a microprocessor 1004 executing instructions stored in a computer readable memory 1005. The instructions, when executed by microprocessor 1004, cause communications device 1000 to perform steps in accordance with embodiments. Computer readable memory 1005 may include volatile memory, non-volatile memory, reprogrammable memory, or a combination of these. Microprocessor 1004 may be any suitable kind of processor, for example a complex instruction set microprocessor, a reduced instruction set microprocessor, a digital signal processor, a microcontroller, or any other circuitry or combination of components that performs similar functions. A power subsystem 1006 routes power to the other components. Optionally, a global positioning system (GPS) receiver 1007 may be included, enabling communications device 1000 to accurately determine its location via GPS. In some embodiments, the power subsystem may include a battery and provision for recharging the battery. An audio system 1008 may include such items as a microphone and a speaker, and may provide for audio communication with the user. Other audio functions may also be provided. The depiction of communications device 1000 in FIG. 10 is simplified, and other components may be present.

While the principles of the disclosure have been described above in connection with specific apparatuses and methods, it is to be clearly understood that this description is made only by way of example and not as limitation on the scope of the disclosure.

What is claimed is:

1. A computerized system for responding to electronic messages that request assistance, the system comprising:
   a processor;
   a computer readable memory, the computer readable memory holding processor instructions that, when executed by the processor, cause the computerized system to:
      receive a communication from a first person, the communication including a request for assistance;
      identify one or more potential assisting persons who are in position to render assistance to the first person and who are not official emergency response personnel, the one or more identified potential assisting persons including at least one person not previously associated with the first person; and
      transmit an electronic notification message to at least one of the one or more potential assisting persons, the electronic notification message indicating that the first person has requested assistance, wherein the electronic notification message comprises information about a likely location of the first person, the likely location determined at least in part based on location information collected by the system from devices not associated with the first person, showing within a defined area where people are likely to be.

2. The computerized system for responding to electronic messages that request assistance as recited in claim 1, wherein the potential assisting persons are identified as being in position to render assistance based at least in part on their proximity to the first person.

3. The computerized system for responding to electronic messages that request assistance as recited in claim 2, wherein the communication is received via a cellular communications network, and wherein potential assisting persons are identified as being in proximity to the first person based at least in part on a determination that communications devices registered to the potential assisting persons are interacting with the same cell of the cellular communications network as a device registered to the first person.

4. The computerized system for responding to electronic messages that request assistance as recited in claim 2, wherein potential assisting persons are identified as in proximity to the first person based at least in part on information from a global positioning system receiver or an assisted global positioning system.

5. The computerized system for responding to electronic messages that request assistance as recited in claim 1, wherein the potential assisting persons are identified based on criteria selected based at least in part on the nature of the request for assistance.

6. The computerized system for responding to electronic messages that request assistance as recited in claim 5, wherein the criteria are based at least in part on information previously supplied by the potential assisting persons.

7. The computerized system for responding to electronic messages that request assistance as recited in claim 1, wherein the electronic notification message comprises information about the location of the first person.

8. The computerized system for responding to electronic messages that request assistance as recited in claim 1, wherein the instructions, when executed by the processor, further cause the computerized system to:
   access a database listing persons who have opted in to receive the electronic notification message; and
   transmit the electronic notification message only to potential assisting persons who have opted in.

9. The computerized system for responding to electronic messages that request assistance as recited in claim 1, wherein the instructions, when executed by the processor, further cause the computerized system to:
   access a database listing persons who are associated with the first person; and
   transmit the electronic notification message to at least one potential assisting person who is associated with the first person.

10. The computerized system for responding to electronic messages that request assistance as recited in claim 1, wherein the electronic notification message is transmitted to at least one potential assisting person in the form of a short message service message or in the form of a telephone call.

11. The computerized system for responding to electronic messages that request assistance as recited in claim 1, wherein the electronic notification message comprises a digital image.

12. The computerized system for responding to electronic messages that request assistance as recited in claim 1, wherein the instructions, when executed by the processor, cause the computerized system to:
   receive a return telephone call from at least one of the potential assisting persons; and
   connect the return telephone call to a customer service representative.

13. A method for operating a service center, the method comprising:
   receiving an electronic communication from a first person, the electronic communication including a request for assistance;
   automatically identifying one or more potential assisting persons who are in position to render assistance to the first person and who are not official emergency response personnel, wherein the one or more potential assisting persons include at least one potential assisting person not previously associated with the first person; and
   transmitting, over a communications network, an electronic notification message to at least one of the one or more potential assisting persons, the electronic notification message indicating that the first person has requested assistance, wherein the electronic notification message comprises information about a likely location of the first person, the likely location determined at least in part based on location information collected by the service center from mobile devices not associated with the first person, showing within a defined area where people are likely to be.

14. The method for operating a call service center as recited in claim 13, wherein automatically identifying one or more potential assisting persons who are in position to render assistance to the first person comprises identifying the potential assisting persons based in part on their proximity to the first person.

15. The method for operating a call service center as recited in claim 14, wherein the communication is received via a cellular communications network, and wherein automatically identifying one or more potential assisting persons who are in position to render assistance to the first person comprises identifying the potential assisting persons based at least in part on a determination that communications devices registered to the potential assisting persons are interacting with the same cell of the cellular communications network as the first person.

16. The method for operating a call service center as recited in claim 14, automatically identifying one or more potential assisting persons who are in position to render assistance to the first person comprises identifying the potential assisting persons based at least in part on information from a global positioning system receiver or an assisted global positioning system.

17. The method for operating a call service center as recited in claim 13, further comprising:
   accessing a database listing persons who have opted in to receive the electronic notification message; and
   transmitting the electronic notification message only to potential assisting persons who have opted in.

18. The method for operating a call service center as recited in claim 13, further comprising:
   accessing a database listing persons who are associated with the first person; and
   transmitting the electronic notification message to at least one potential assisting person who is associated with the first person.

19. The method for operating a call service center as recited in claim 13, wherein transmitting the electronic notification message comprises transmitting a short message service message or placing a telephone call.

20. The method for operating a call service center as recited in claim 13, wherein transmitting the electronic notification message comprises transmitting an electronic message comprising a digital image received in the electronic communication from the first person.

21. The method for operating a call service center as recited in claim 13, further comprising:
   receiving a return telephone call from at least one of the potential assisting persons; and
   connecting the return telephone call to a customer service representative.

22. The computerized system for responding to electronic messages that request assistance as recited in claim 1, wherein the one or more identified potential assisting persons include at least one person who does not appear on a contact list previously provided by the first person.

23. The method for operating a call service center as recited in claim 13, wherein the one or more identified potential assisting persons include at least one person who does not appear on a contact list previously provided by the first person.

24. The computerized system for responding to electronic messages that request assistance as recited in claim 1, wherein the electronic notification message includes a digital map depicting locations of the first person and of at least one potential assisting person.

25. The method for operating a call service center as recited in claim 13, wherein automatically identifying one or more potential assisting persons who are in position to render assistance to the first person comprises identifying clients of an entity operating the call service center.

26. The method for operating a call service center as recited in claim 16, wherein automatically identifying one or more potential assisting persons who are in position to render assistance to the first person comprises identifying persons based at least in part on their membership in an affinity group related to the first person.

27. A computerized system for responding to electronic messages that request assistance, the system comprising:
   a processor;
   a computer readable memory, the computer readable memory holding processor instructions that, when executed by the processor, cause the computerized system to:
      receive a communication from a first person, the communication including a request for assistance;
      identify one or more potential assisting persons who are in position to render assistance to the first person and who are not official emergency response personnel, the one or more identified potential assisting persons including at least one person not previously associated with the first person; and
      transmit an electronic notification message to at least one of the one or more potential assisting persons, the electronic notification message indicating that the first person has requested assistance, wherein the electronic notification message comprises information about a likely location of the first person, the likely location determined at least in part based on location information collected by the system from mobile device users other than the first person.

28. The computerized system for responding to electronic messages that request assistance as recited in claim 27, wherein the potential assisting persons are identified as being in position to render assistance based at least in part on their proximity to the first person.

29. The computerized system for responding to electronic messages that request assistance as recited in claim 27, wherein the potential assisting persons are identified as being in position to render assistance based at least in part on their membership in an affinity group related to the first person.

30. A method for operating a service center, the method comprising:
   receiving an electronic communication from a first person, the electronic communication including a request for assistance;
   automatically identifying one or more potential assisting persons who are in position to render assistance to the first person and who are not official emergency response personnel, wherein the one or more potential assisting persons include at least one potential assisting person not previously associated with the first person; and
   transmitting, over a communications network, an electronic notification message to at least one of the one or more potential assisting persons, the electronic notification message indicating that the first person has requested assistance, wherein the electronic notification message comprises information about a likely location of the first person, the likely location determined at least in part based on location information collected by the service center from mobile device users other than the first person.

31. The method for operating a call service center as recited in claim 30, wherein automatically identifying one or more potential assisting persons who are in position to render assistance to the first person comprises identifying persons based at least in part on their proximity to the first person.

32. The method for operating a call service center as recited in claim 30, wherein automatically identifying one or more potential assisting persons who are in position to render assistance to the first person comprises identifying persons based at least in part on their membership in an affinity group related to the first person.

* * * * *